United States Patent [19]
Peters

[11] 3,995,429
[45] Dec. 7, 1976

[54] APPARATUS FOR GENERATING POWER USING ENVIRONMENTAL TEMPERATURE DIFFERENTIALS

[75] Inventor: Melville F. Peters, Livingston, N.J.

[73] Assignees: Walter Todd Peters; Margot Elizabeth Peters, both of East Dennis, Mass.; Albert F. Kronman, Locust Valley, N.Y.

[22] Filed: July 14, 1975

[21] Appl. No.: 595,570

[52] U.S. Cl. .................. 60/641; 60/676; 60/671

[51] Int. Cl.² ............ F01K 25/10; F03G 7/02

[58] Field of Search ............ 60/641, 651, 671, 676

[56] References Cited
UNITED STATES PATENTS 3,950,949  4/1976  Martin et al. ............... 60/676

Primary Examiner—Allen M. Ostrager
Attorney, Agent, or Firm—Albert F. Kronman

[57] ABSTRACT

A system of generating electric power derived from the energy of the sun, the atmosphere, the ground or the heat stored in ground water, whichever provides the greatest temperature differential with another adjacent source of energy. During the daytime when the sun is shining, a solar absorber composed of a plurality of black pipes may provide the heat necessary to generate power. At night when the air temperature is lowered, a set of pipes in the ground or in a lake may provide the heat necessary to extract power by using the low temperature of the environment. A third source of heat such as geothermal heat, stored heat or a heat pump may be part of the system. Switching means are used to convert from one system to another depending upon which system has the greatest temperature differential.

10 Claims, 6 Drawing Figures

VAPOR PRESSURES OF PURE HYDROCARBONS

APPARATUS FOR GENERATING POWER USING ENVIRONMENTAL TEMPERATURE DIFFERENTIALS

BACKGROUND OF THE INVENTION

The sun provides the earth with all the energy necessary for all human needs but such energy is generally wasted and allowed to radiate to outer space. There have been some installations where solar absorbers have been used to heat homes during the sunlight hours, but these cannot operate during the night. For the most useful conversion of environmental energy, two temperature sources must be available, one hot and one cold, thereby providing a temperature differential. By the use of a suitable fluid which evaporates in the hot heat source and condenses in the relatively cold heat sink, the power of expansion of the fluid can be used to drive a turbine or piston engine and thereby turn an electric generator to produce electric power. The temperature differential can also be used to operate a thermo-electric unit.

One of the features of the present invention is the use of four different sources of heat, used in four combinations to generate power during most of the day and night, even though the temperatures may vary over a wide range of values.

Another feature of the invention is the automatic switching means which switches from one pair of heat sources having a temperature differential to another without operator supervision.

Another feature of the invention is the use of the earth's heat or a deep river or lake, as one of the heat sources.

SUMMARY

The invention comprises an apparatus which generates a fluid vapor pressure for the operation of a vapor engine and includes at least three heat sources. One of the sources is a solar absorber for absorbing the heat from the sun. A second source is a heat exchanger which dissipates the heat of the fluid to the atmosphere. A third source is a radiator positioned in the ground water, a fourth source for transforming ground or geothermal heat to the fluid also for transferring the heat of the ground water to the fluid, other well-known heat sources may be substituted when available. Valve connecting means are operated to connect any two of the four heat sources in a closed cycle system for the transfer of heat from one source to another. Pumping means are provided for forcing fluid through the system to a source where the fluid is vaporized. The valve connecting means are controlled by temperature sensors for switching the fluid flow to move between the two heat sources having the greatest temperature differential. The mechanical power is produced by a transducer such as a turbine or piston engine connected to the heat source which vaporizes the fluid.

Additional details of the invention will be disclosed in the following description, taken in connection with the accompanying drawings.

DESCRIPTION OF THE PREFERRED EMBODIMENTS

Figure 1:
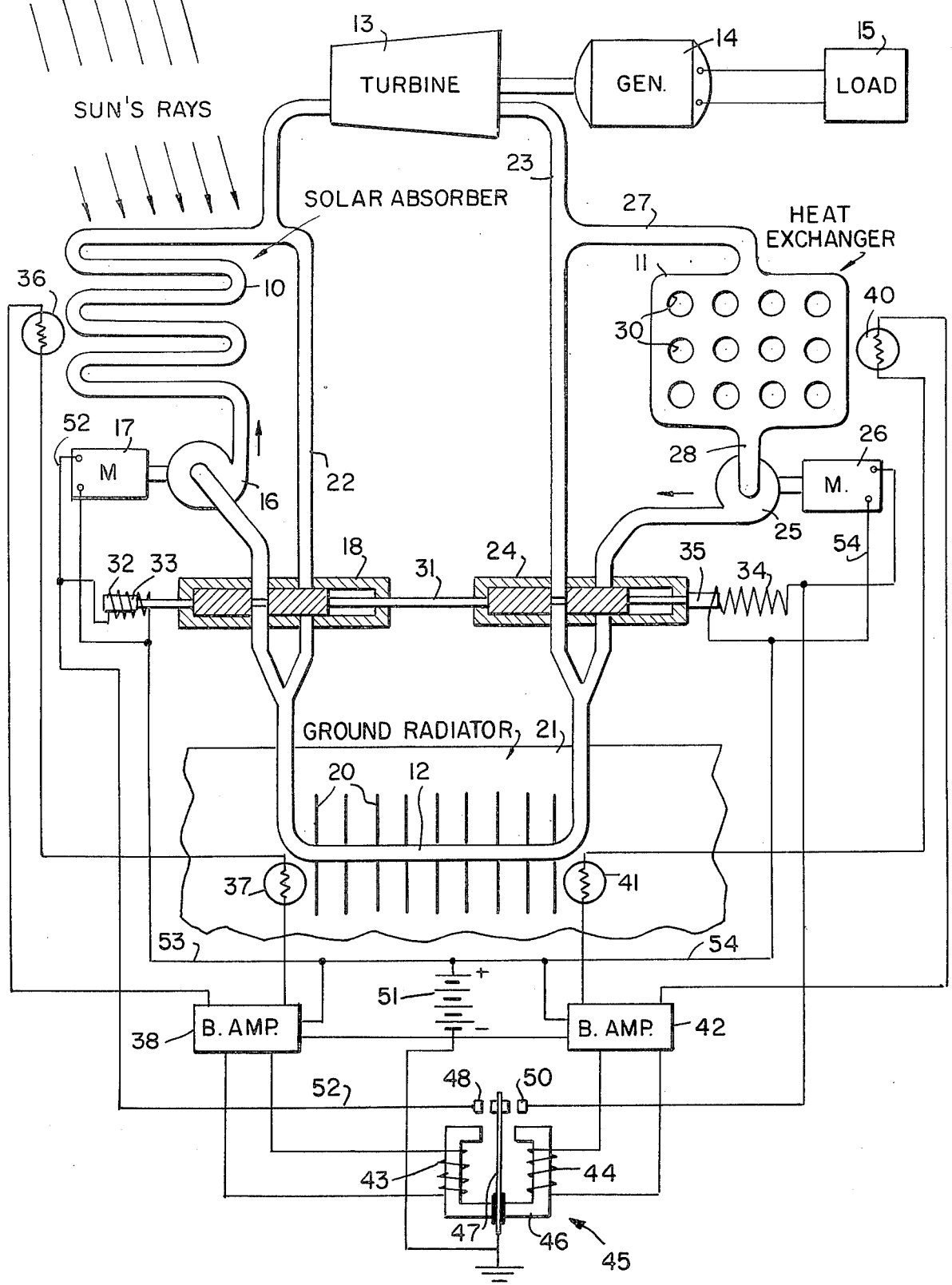
FIG. 1 is a diagramatic view of connections of the invention showing a system having two modes of operation.

Referring now to FIG. 1, the apparatus includes three heat sources, a solar absorber 10, a heat exchanger 11, and a ground radiator 12. The solar absorber is positioned in a place where the rays of the sun can shine on its pipes and heat up the fluid in the pipes to produce a vapor pressure. The pipes comprising the solar absorber are preferrably painted black to increase the absorptive power. The output of the absorber 10 is connected directly to a turbine 13 for converting the energy in the vaporized absorber into mechanical power. The turbine 13 is coupled to an electrical generator 14 for conversion into electrical power for application to a load 15.

The input end of the solar absorber 10 is connected to a fluid pump 16 run by an electric motor 17. The pump 16 moves condensed fluid through a slide valve 18, connected to the ground radiator 12 where the fluid is condensed. The ground radiator 12 is composed of one or more pipes having radiating fins 20 and is positioned in the ground 21 and surrounded by water or positioned at the bottom of a deep river or in a lake where the temperature is generally a constant 53° F (11° C). In some combinations, the ground radiator may act as a heat sink for condensing the vapor. In other combinations the radiator 12 may act as a heat source, receiving liquid fluid and transforming it into a vapor. The output of the radiator 12 is connected to valve 18 and pump 16 for one mode of operation when the valve piston is in the position shown in FIG. 1. The ground radiator 12 may be connected directly to turbine 13 by conduit 22 when the valve 18 is moved to its other position.

The input end of the ground radiator 12 is connected to the output pipe 23 of the turbine and valve 24 for operation in the first mode. When valves 18 and 24 are moved to their second position, the radiator input is connected to a second pump 25 and the heat exchanger 11. Pump 25 is run by an electric motor 26. The heat exchanger 11 is a container having an input conduit 27 and an output conduit 28 connected to the input section of pump 25. The container portion of the exchanger is provided with a plurality of transverse openings 30 to permit the ambient air to flow through the container and exchange heat, depending upon the temperature difference.

The slide valves 18 and 24 are coupled together by means of a rod 31, both slide pistons operating together, being moved to the position shown in FIG. 1 by a solenoid winding 32 operating on a core 33. When the second mode is sensed, a second solenoid winding 34 operates on a second core 35 to transfer both pistons to the right as shown in FIG. 1. The solenoid winding 32 and motor 17 are connected in parallel so that when the valve pistons are moved to the left motor 17 and pump 16 are both energized. A similar connection exists between solenoid winding 34 and motor 26.

In order to determine the best of two operating modes or none at all, four sensors are placed in position adjacent the three heat sources. These sensors may be of several forms, the most desirable are thermistors since they require minimal current and require no mechanical movement. A first thermistor 36 is positioned adjacent to the solar absorber 10 and changes its resistance responsive to the temperature of the absorber. A second thermistor 37 is placed in the ground near the ground radiator 12, thermistors 36 and 37 being connected in series and to a buffer amplifier 38. The series connection, plus a small current provided by the amplifier 38 impresses a voltage on the amplifier input circuit which is responsive to the temperature difference between the two heat sources. In a similar manner thermistor 40 is adjacent to the heat exchanger 11 and thermistor 41 is adjacent to the ground radiator 12. These thermistors are also connected in series and to the input terminals of a second buffer amplifier 42. Again, the applied voltage is responsive to the temperature difference between the two heat sources.

The output terminals of the two amplifiers 38 and 42 are connected directly to windings 43 and 44 of a differential relay 45 having an iron core 46, an armature 47 and two contact pairs 48 and 50. The armature 47 is connected to ground and to the negative terminal of a source 51 of direct current power which may be a battery as shown. A transistor differential amplifier may be used instead of a relay. Such an amplifier is described in Transistor Manual, published by The General Electric Co., page 111.

The operation of the circuit shown in FIG. 1 is as follows: During the sunlight hours, when the sun is shining on the solar absorber 10, the temperature of thermistor 36 will be much higher than the temperature of the ambient atmosphere and thermistor 40. For this reason the voltage applied to amplifier 38 is larger than the voltage applied to amplifier 42. The output current from amplifier 38 is also larger than the output current from amplifier 42 and the armature 47 will be moved to the left, closing contacts 48 and connecting conductor 52 to ground and completing a circuit which can be traced from ground, through battery 51, over conductor 53 to solenoid winding 32 and motor 17, moving the valve pistons to the left, as shown in FIG. 1, and starting motor 17 and pump 16 to pump fluid from the ground radiator 12 through the radiation absorber 10, where the fluid is vaporized, then through the turbine, and back to the other side of the radiator 12 by way of conduit 23 and valve 24. The fluid is condensed in the ground radiator and then pumped again into the solar absorber 10. This is a closed cycle operation and the action continues as long as the temperature differential retains armature 47 in a position where contacts 48 are closed.

When the sun goes down and the temperature differential between thermistors 36 and 37 is lowered, the current in winding 43 is decreased and armature 47 may resume its neutral position in which case all action stops. If, however, there is a sufficient temperature difference between thermistor 40 at the heat exchanger 11 and thermistor 41 near the ground radiator 12, then amplifier 42 sends current to winding 44 to move armature 47 to the right, closing contacts 50 and completing another operating circuit. The second circuit may be traced from battery 51 over conductor 54 to solenoid winding 34 and motor 26, moving both valve pistons to the right and starting the motor 26 and pump 25. The pump 25 moves condensed fluid from the heat exchanger 11, through valve 24 and the ground radiator 12 where the fluid is vaporized, then through valve 18 and over conduit 22 to the turbine 13 which is set in rotation, producing mechanical power. From the turbine 13 the fluid is returned through conduits 23 and 27 to the heat exchanger 11 where the vapor is condensed and started on another cycle of operations.

It should be noted that the radiator below the surface of the ground acts as a condenser for the vaporized fluid during the first mode, and acts as a vaporizer of the liquid fuel in the second mode of operation. It is within the purview of the invention to change the fluids in the system from winter to summer modes.

Figure 2:
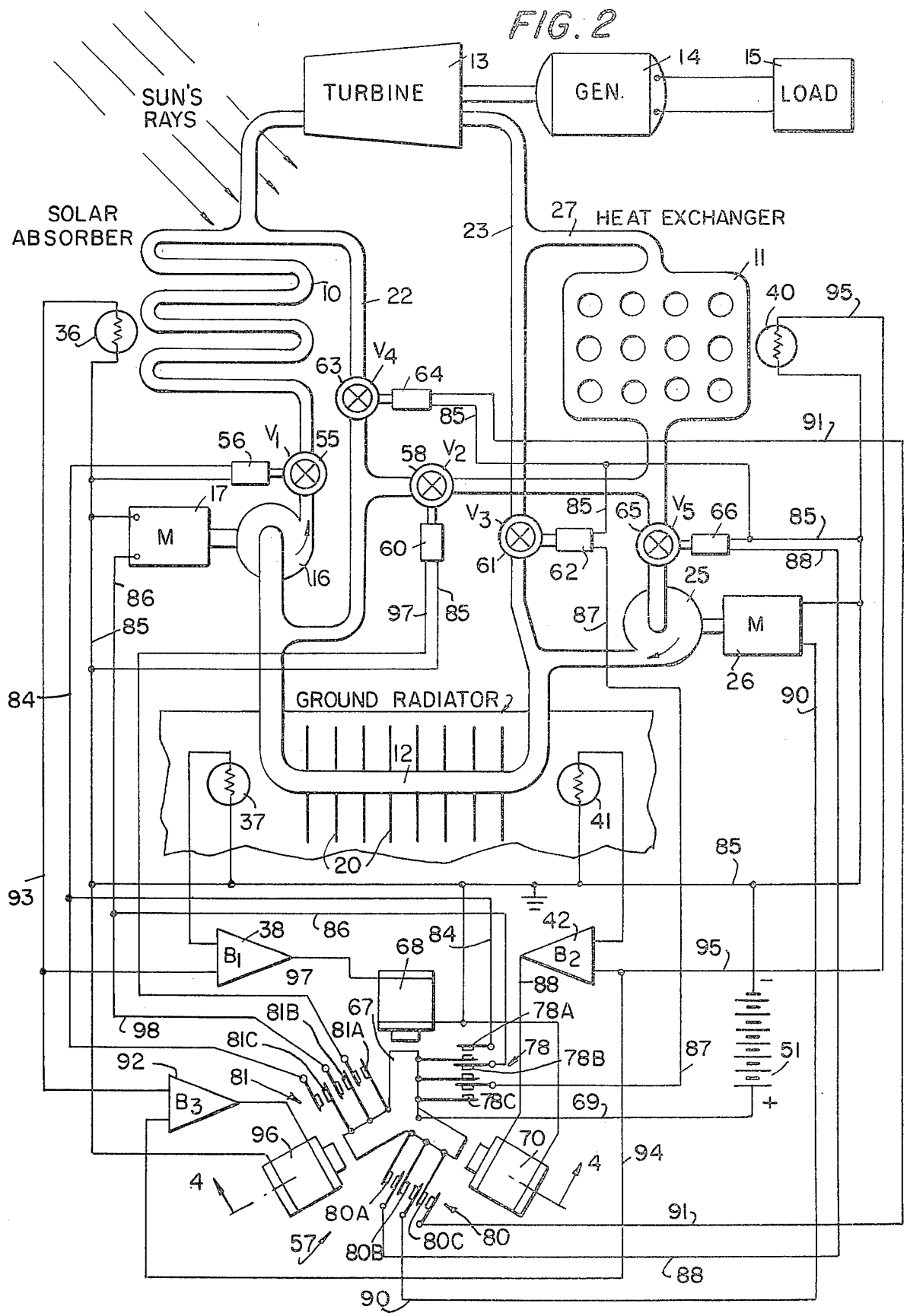
FIG. 2 is a view similar to FIG. 1 but showing three modes of operation. This figure shows the preferred embodiment of the invention.

The arrangement shown in FIG. 2 is similar to that shown in FIG. 1, having a solar absorber 10, a heat exchanger 11, and a ground radiator 12 with fins 20. Also, the four thermistors 36, 37, 40 and 41 are similarly placed and connected to buffer amplifiers 38 and 42. A motor 17 turns pump 16 to move condensed fluid into absorber 10 and, in a like manner, motor 26 drives pump 25 to move condensed fluid from the exchanger 11 into the ground radiator 12. However, the valve array has been changed so as to provide three modes of operation instead of two. A first solenoid operated valve 55 is connected between the pump 16 and the solar absorber 10 to control the flow of condensed fluid into the absorber. This valve 55 is operated by a solenoid 56 connected to a relay array 57. A second valve 58, operated by a solenoid 60 connects the output of the heat exchanger 11 to the input side of the pump 16. This valve 58 is opened only when the absorber 10 and the exchanger 11 are in the generating cycle.

A third valve 61 operated by a solenoid 62 is connected in series with a conduit 23 which bypasses the heat exchanger 11 whenever the operating cycle includes only the ground radiator and the solar absorber. A fourth valve 63 operated by a solenoid 64 is connected in series with a conduit 22 which bypasses pump 16 and the solar absorber 10 whenever the operating cycle includes only the heat exchanger 11 and the ground radiator 12. A fifth valve 65 operated by solenoid 66 is connected between pump 25 and the heat exchanger 11. This valve is opened whenever the operating cycle includes the second pump 25 and is closed whenever the pump 25 and motor 26 are not running. All five valves are connected to resilient means (not shown) so that they are closed unless opened by action of the adjoining solenoid.

The valves, solenoids, pumps, and motors are all controlled in their operation by a three winding relay 57 having three sets of three contact pairs. The contacts are operated by a tilt plate 67 which insures that only one set of contacts is closed at any time. The illustration of the three winding relay 57 in FIG. 2 is diagramatic, a more detailed view being shown in FIG. 4 which is a cross sectional view taken generally along line 4—4 of FIG. 2.

Figure 4:
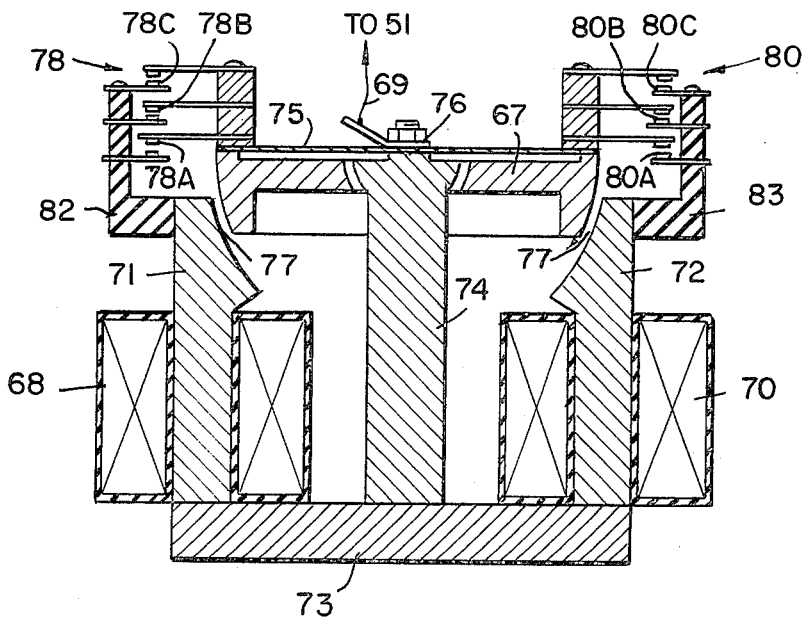
FIG. 4 is a cross sectional view of a relay having three windings and three sets of contacts for switching the apparatus to any one of three modes of operation.

FIG. 4 shows two windings 68 and 70 surrounding two legs 71 and 72 of an iron core which also includes a base member 73 and a central portion 74. A tilt plate 67 is mounted on the upper end of portion 74 and held in place by a spring 75. The tilt plate 67 is made of iron and completes the three magnetic circuits formed by the three legs. The center of movement of the tilt plate is just below the nut 76 which holds the plate 67 in place and maintains a constant air gap 77 between the upper ends of the legs and the outer ends of the plate. The air gaps are spherical in shape so that a movement of the tilt plate 67 does not change the air gap distance, only the gap area.

A set of three contacts 78, 80 and 81 are mounted on the tilt plate 67 all three of each set being connected to the tilt plate and a conductor 69 connecting the plate to battery 51. The stator halves of these contact pairs are secured to the sides of the legs 68, 70 by insulator brackets 82, 83. Since the magnetic circuit is designed with three air gaps of varying area instead of varying distance, there is a linear relationship between the magnetic lines of force and the tilt of the plate 67. This means that if the current in winding 70 closes contacts 80 and then a stronger current is applied to winding 68, the plate 67 will be tilted to the left (FIG. 4) and contacts 78 will be closed while contacts 80 will be opened.

The operation of the apparatus shown in FIG. 2 is as follows: When the sun is shining and the fluid in the solar absorber 10 is vaporized, the thermistor 36 is heated while the thermistor 37 in the ground is cold. This temperature differential is applied to buffer amplifier 38 and current is sent to winding 68 of the tilt relay 57, tilting plate 67 and closing contacts 78. A first set of contacts 78A sends current from the positive side of battery 51 through contacts 78A, over conductor 84, to solenoid 56, opening valve 55, then back to the other side of battery 51 by way of grounded conductor 85. A second set of contacts 78B sends current from the battery 51 through the contacts 78B and then over conductor 86 to motor 17, starting the motor and operating pump 16. A third set of contacts 78C sends current from the battery 51, through contacts 78C, then over conductor 87 to solenoid 62 to open valve 61, and then over grounded conductor 85 back to the other side of the battery. With valves 55 and 61 open, and pump 16 energized, liquid is pumped into the solar absorber 10 where it is vaporized. The vapor turns turbine 13 and flows down through conduit 23, through valve 61 to the ground radiator where it is condensed and then moved by pump 16 into the radiation absorber 10 to complete the cycle.

After the sun sets and the air cools, the ground thermistor 41 may be higher in temperature than the heat exchanger 11 and its adjoining thermistor 40. In this case a potential is applied to the input terminals of buffer amplifier 42 and an operating current applied to winding 70 over conductor 88. This action tilts plate 67 so that contacts 80 are closed, thereby activating a second mode of operation. Contacts 80A complete a circuit from the battery, through the contacts, over conductor 88, to solenoid 66 opening valve 65, then back to the other side of the battery over grounded conductor 85. Contacts 80B complete a circuit from the positive side of battery 51, through contacts 80B, over conductor 90, to the motor 26, then back to the negative side of the battery by way of grounded conductor 85. This circuit starts the motor 26 and turns the pump 25 forcing condensed fluid through the ground radiator 12 where it is vaporized. The third set of contacts 80C completes a circuit which may be traced from the battery 51 through contacts 80C, over conductor 91, to solenoid 64 which opens valve 63, then over grounded conductor 85 to the other side of the battery. This action permits the vapor generated in ground radiator 12 to pass through valve 63 to the turbine 13. At this time valve 55 is closed and pump 16 is not in operation. After the vapor leaves the turbine it flows through conduits 23 and 27 into the heat exchanger 11 where it is condensed. Then the condensed fluid moves through valve 65 and pump 25 to complete the operating cycle.

A third condition may exist during winter time when the sun's rays heat the solar absorber 10 and the heat exchanger 11 is colder than the ground radiator. In this case, thermistors 36 and 40, connected in series with the input terminals of amplifier 92, produce the greatest sensing voltage. This thermistor circuit includes conductors 93, 94, and 95. Buffer amplifier 92 sends its output current to winding 96 of the relay 57 and thereby closes three contacts 81. Contacts 81A complete a circuit which can be traced from the positive terminal of battery 51, through contacts 81A, then over conductor 97, to solenoid 60 which opens valve 58, then back to the negative side of the battery by way of grounded conductor 85. Contacts 81B complete a circuit which starts at the battery 51, through contacts 81B, over conductors 98 and 86, to motor 17 which turns pump 16, then back to the other side of the battery by way of conductor 85. Contacts 81C complete a circuit from the battery 51, through the contacts 81C, over conductor 84 to solenoid 56, then back over conductor 85 to the other side of the battery 51. These circuits open valves 58 and 55 and start the movement of fluid through pump 16, valve 55, into the solar absorber 10 where the fluid is vaporized, then through the turbine 13, into the heat exchanger 11 by way of conduits 23 and 27 where the fluid is condensed and back to the pump 16 by way of conduit 18 and valve 58. This closed circuit path omits the ground radiator 12 because it is not necessary on a cold winter's day when the sun is shining.

Figure 3:
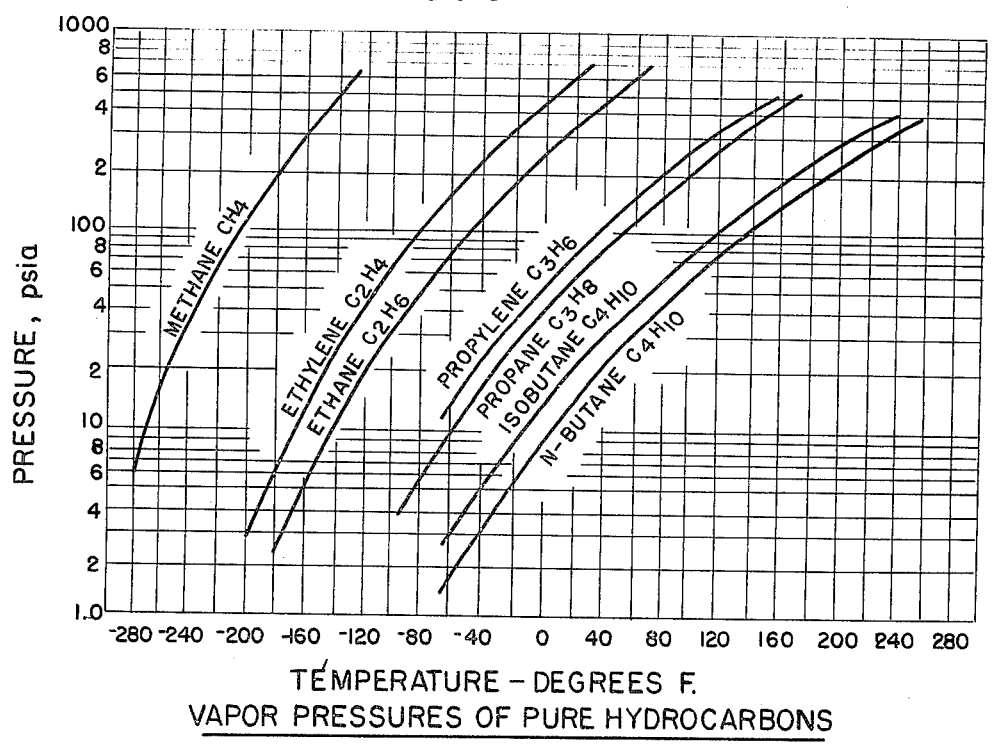
FIG. 3 is a graph showing the vapor pressures of several available fluids which can be employed in the apparatus.

FIG. 3 shows the relationship between seven pure hydrocarbons, indicating their range of pressures as the temperature is varied. The preferred fluid is propane $C_3H_8$ with propylene $C_3H_6$ the next most desirable fluid. It should be noted that the system is a closed system with no vents or exhaust parts. With no leakage, the fluid need not be replaced.

Figure 5:
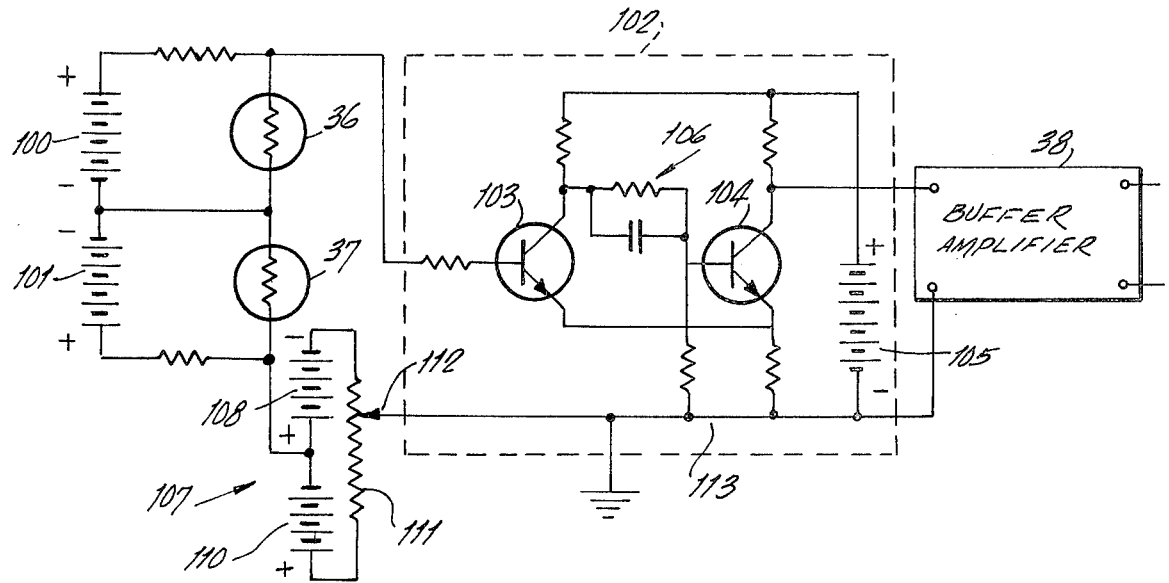
FIG. 5 is a circuit diagram of connections showing two thermistors connected in series to the input of a Schmitt trigger circuit.

The efficient operation of the system described above requires a temperature differential great enough to change a fluid into a vapor at an increased pressure. The pressure must be large enough to generate a reasonable amount of power. Operating at a lower temperature difference can be wasteful of the equipment and even cause malfunctioning of the unit. For this reason the circuit shown in FIG. 5 is connected between the thermistor pairs, 36–37. Each thermistor has its own battery 100, 101 and the output of this circuit is applied to the input circuit of a Schmitt trigger 102, a well known trigger circuit which is actuated by the amplitude of its input voltage rather than a triggering pulse.

The Schmitt trigger includes two transistors 103, 104 powered by a 12 volt battery 105 and coupled together by an RC circuit 106. When the input voltage is less than 6.6 volts, transistor 103 is nonconductive and transistor 104 conducts drawing current through the 2.2K resistor and reducing the output voltage to amplifier 38 to about 8 volts. When the input voltage from the thermistors rises to more than 6.6 volts, conduction is transferred from transistor 104 to transistor 103 and applying 12 volts to the buffer amplifier 38. In practice, this step of 4 volts may not be enough for efficient operation and for this reason a voltage bias circuit 107 is added to make the step voltage adjustable.

The bias circuit 107 includes two batteries 108 and 110 and a potentiometer 111 having a manually adjustable sliding contact 112. By adjusting the contact 112 an added bias voltage is connected between the two thermistors and the grounded conductor 113. The bias voltage is added (or subtracted) to the 6.6 volt value which normally triggers the circuit 102.

Figure 6:
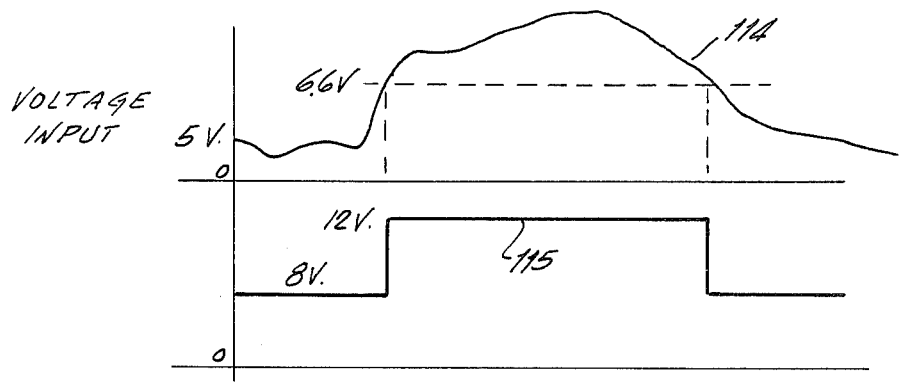
FIG. 6 is a graph showing the operation of the circuit of FIG. 5.

FIG. 6 is a graph which shows a conventional voltage curve 114 derived from two thermistors 36, 37 during day's time. The curve 114 is similar to a temperature curve and increases in value after sunrise to its maximum value in the afternoon. The second curve 115 is the output voltage applied to the buffer amplifier 38, the 12 volt line representing a condition which starts the motor 17 (FIG. 2) and operated the system in the first mode. Using the Schmitt trigger cirucit there is no operation when the input voltage is less than 6.6 volts.

Having thus fully described the invention, what is claimed as new and desired to be secured by Letters Patent of the United States is:

1. Apparatus for generating fluid vapor pressure for the operation of a vapor engine comprising at least three heat sources of variable temperature, a fluid selectively circulated between the heat sources, sensing means for determining the greatest temperature differential between the heat sources, valve means for connecting fluid to any two of the heat sources having the greatest temperature differential to provide a closed cycle system for the transfer of heat from the one source to the other, pumping means for forcing fluid through the system to a heat source, a power transducer connected to a heat source which vaporizes a fluid.

2. Apparatus according to claim 1 wherein one of the three heat sources is a solar absorber.

3. Apparatus according to claim 1 wherein one of the heat sources has a heat exchanger in contact with ambient temperatures.

4. Apparatus according to claim 1 wherein one of the heat sources comprises a radiator in contact with the earth.

5. Apparatus according to claim 1 wherein the vapor engine is a turbine coupled to an electric generator.

6. Apparatus according to claim 1 wherein the fluid in said heat sources is propane.

7. Apparatus according to claim 1 wherein the pumping means include two liquid pumps connected to electric motors.

8. Apparatus according to claim 1 wherein the switching means is an electrical switching means which includes a relay having three windings and relay contacts connected in series with the pump motors and predetermined valves.

9. Apparatus according to claim 1 wherein the electrical switching means includes a three winding relay, having three spaced legs for supporting the windings, and a tilt plate supported at its center and movable in any one of three tilting modes to close any one of three sets of contacts responsive to the current amplitude in the three windings.

10. Apparatus according to claim 1 wherein the fluid in the heat sources and connecting means is propylene.

* * * * *